United States Patent [19]

Meunier et al.

[11] 4,369,834
[45] Jan. 25, 1983

[54] PROCESS FOR RECUPERATION OF HEAT FROM A GASEOUS CURRENT

[75] Inventors: Georges Meunier, Boulogne; Jean-François Martin, La Celle Saint-Cloud, both of France

[73] Assignee: Tunzini-Nessi Enterprises d'Equipements, Paris, France

[21] Appl. No.: 133,989

[22] Filed: Mar. 26, 1980

[30] Foreign Application Priority Data

Mar. 27, 1979 [FR] France ................ 79 07605

[51] Int. Cl.³ ............................................ F28D 19/02
[52] U.S. Cl. ........................ 165/104.16; 165/104.18; 122/7 R
[58] Field of Search ............ 165/104.15, 104.18, 165/104.16; 122/7 R

[56] References Cited

U.S. PATENT DOCUMENTS

| | | |
|---|---|---|
| 2,741,603 | 4/1956 | Fahnestock ............ 165/104.18 X |
| 2,770,543 | 11/1956 | Arnold et al. . |
| 2,967,693 | 8/1956 | Cunningham et al. . |
| 3,905,336 | 9/1975 | Gamble et al. . |

FOREIGN PATENT DOCUMENTS

| | | |
|---|---|---|
| 409298 | 7/1967 | Australia . |
| 1150776 | 1/1958 | France . |
| 2179145 | 11/1973 | France . |
| 2325891 | 4/1977 | France . |
| 21739 | 1/1939 | United Kingdom . |
| 525197 | 8/1940 | United Kingdom ........... 165/104.15 |
| 668995 | 3/1952 | United Kingdom . |
| 821003 | 9/1959 | United Kingdom . |
| 1113176 | 5/1968 | United Kingdom . |
| 1375238 | 11/1974 | United Kingdom . |

*Primary Examiner*—Albert W. Davis, Jr.
*Attorney, Agent, or Firm*—Pennie & Edmonds

[57] ABSTRACT

The invention has for its object a process for recovering heat from a hot gaseous current, wherein it consists in making the hos gaseous current travel countercurrent to colder solid particles comprising at least a stage made up of a stack of packing elements placed on a widely perforated support, then distributing them at the top of a second column, letting them fall countercurrent to a second colder gaseous current while their grain-from-grain separation, to recover the heat of the solid heated particles.

The invention also proposes a device for using the process.

12 Claims, 6 Drawing Figures

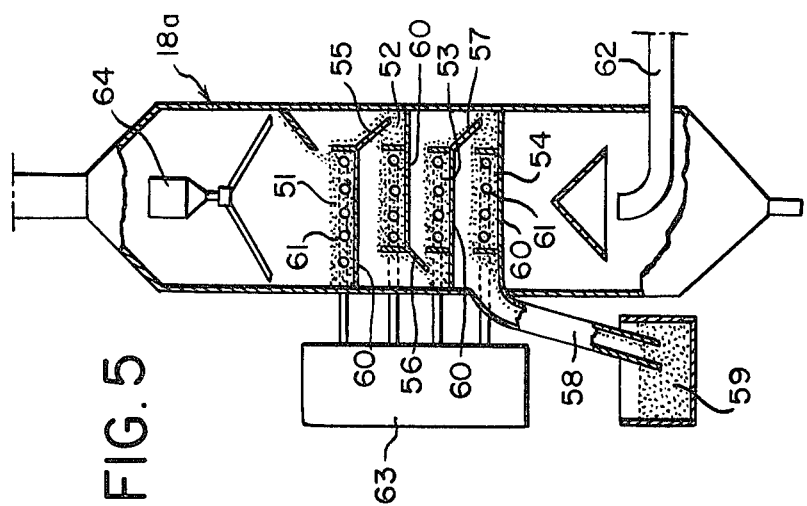
FIG. 5
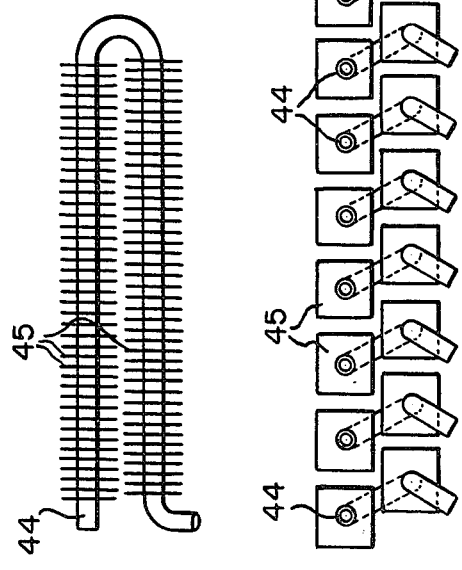
FIG. 2
FIG. 3
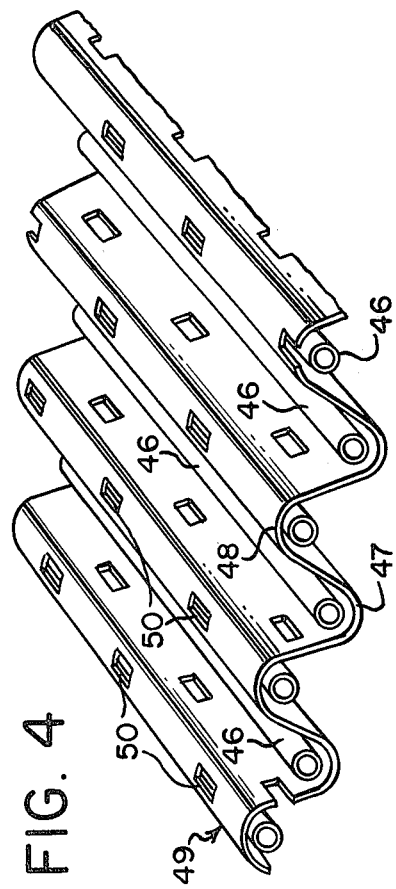
FIG. 4

PROCESS FOR RECUPERATION OF HEAT FROM A GASEOUS CURRENT

TECHNICAL FIELD

This invention relates to a process for recovering heat from a gaseous current, particularly from fumes.

BACKGROUND OF THE INVENTION

To recover heat from fumes it is known to use pipes placed in the path of the fumes and in which a heat-carrying fluid circulates. Also, to cool or heat divided solids it has been proposed to entrain the solids in a gaseous current and make them pass over pipes in which a heat-carrying fluid circulates.

However, use of such pipes does not result in a very high heat exchange efficiency. Further, in the case where the fumes are charged with such substances as sulfates, sulfurous gases or sulfur dioxide, corrosion of the pipes may occur at certain temperatures. Further, the fumes which often contain dust and solid material in suspension, or gaseous currents that carry divided solids tend to clog the exchange pipes and abrade them so that the pipes must be cleaned or changed frequently.

This invention aims at remedying these drawbacks and in particular in providing a process for recovering heat exhibiting a clearly higher efficiency and a process that avoids the phenomena of corrosion of the pipe and their clogging.

It also aims at providing a process making it possible to simultaneously clean the fumes.

DESCRIPTION OF THE INVENTION

For this purpose, this invention has as its object a process of recovering heat from a hot gaseous current which comprises in making the hot gaseous current travel countercurrent to colder solid separated particles falling by gravity through a first column having at least one stage made up of a stack of packing elements placed on a support grill, then in distributing the separated particles thus heated to the top of a second column where they fall countercurrent to a second colder gaseous current which recovers the heat of the solid particles that have been heated.

In a first embodiment, a boiler is associated with the second column where the second column includes a pipe through which a heat-carrying fluid flows, the heat then being transferred by said fluid.

Advantageously the second gaseous current, which is heated at the output of the second column, is then joined to the first hot gaseous current to be sent into the first column.

In a second embodiment, the second column comprises a column similar to the first column, i.e., it has at least one stage made up of a stack of packing elements placed on a support grill and the heat of the second gaseous current is recovered.

Advantageously, in the two embodiments, the divided solid particles are collected at the bottom of the second column is recycled into the first column.

The process according to the invention makes possible in the first column the purification of a gaseous current made up of fumes, both by filtering and by chemical reaction, thanks to an appropriate choice of solid particles. Further, it makes it possible to avoid the phenomena of corrosion and clogging of the prior art. Finally, by use of a storage tank of the solid particles coming from the first column it is possible to store energy, particularly to adjust periodic fluctuations.

The first column is of the type described in French Pat. No. 1,469,109. It has at least one stage made up of a stack of packing elements, such as Pall rings, placed on a support grill. It is provided with a gaseous current input at its base and with a solid particle distributor at its top. As disclosed in French application 78/27,057 the space rate of the support is advantageously such that a dense fluidized bed is not formed above the support. In practice, the space rate of the support is at least equal to 75% of that of the stack of packing elements and the size of its orifices is limited only by the need of supporting the packing elements. The solid particles in such a column remain perfectly separated from one another, and thus, by traveling by gravity countercurrent to the colder gaseous current, make a high-efficiency heat exchange possible.

The solid particles can be made up of different materials and particularly of sand, limestone, dolomite, lime or mixtures of such materials. Sand is an advantageous material because of its low cost, its capacity to store a considerable amount of heat and because it can be used in a wide range of temperatures.

It is also possible to use refractory materials of the microball type of vitroceramic or electrocast refractories that exhibit a good resistance to temperature and a better resistance to attrition.

To recover heats from fumes containing products such as $SO_3$, there are advantageously used limestone, lime, dolomite or mixtures of these products with sand.

The second column can be placed under the first column. However, it is advantageous to separate the two columns for space considerations and adaptation to existing stacks. Separation of the two columns further makes it possible to have an intermediate storage tank between these two columns that is sufficiently large to perform the desired adjustments.

The second column can be located at a great distance from the first column. Thus, it is possible to carry the hot particles by insulated cars to a second column located at a great distance. This transporting over a great distance can be advantageous when there are several small first columns feeding a larger second column. Moreover, it should be noted that it is much easier to transport hot solid particles, for example at a temperature of 600° C., than fumes at the same temperature and especially polluted fumes at this temperature. The solid particles occupy an incomparably smaller space.

If a column having tubes through which a heat-carrying fluid passes is used as the second column, these pipes are advantageously arranged in the form of horizontal layers.

Each of these layers can be made up of a coiled pipe placed above a fluidization grill. The second gaseous current then assures the fluidization of the solid particles by forming above each fluidization grill a fluidized bed in which the coiled pipe is buried.

As known, each fluidized bed is provided with an overflow assuring the gravity flow of solid particles in the second column.

In a preferred embodiment of the invention, the layers are made up of finned pipes. The finned pipes assure a certain retention of the solid particles flowing by gravity, making it possible to obtain a quasi fluidization of the particles and a better heat exchange.

The finned pipes are advantageously placed parallel in the same layer. Each pipe is advantageously connected to a pipe of an adjacent layer which is staggered in relation to it.

As a variant, the layers of pipes through which a heat-carrying fluid travels can be made up of pipes placed parallel in the corrugations of perforated corrugated iron sheet.

Other elements, aims and advantages of this invention will appear from reading the following description given with reference to the accompanying drawings.

BRIEF DESCRIPTION OF THE DRAWINGS

In these drawings:

FIG. 2 represents a finned pipe used in the installation of FIG. 1;

FIG. 3 represents layers of finned pipes used in the installation of FIG. 1;

FIG. 4 represents pipes that can be used as a variant in the installation of FIG. 1;

FIG. 5 represents a variant of a part of the installation represented in FIG. 1;

BEST MODES FOR CARRYING OUT THE INVENTION

Figure 1:
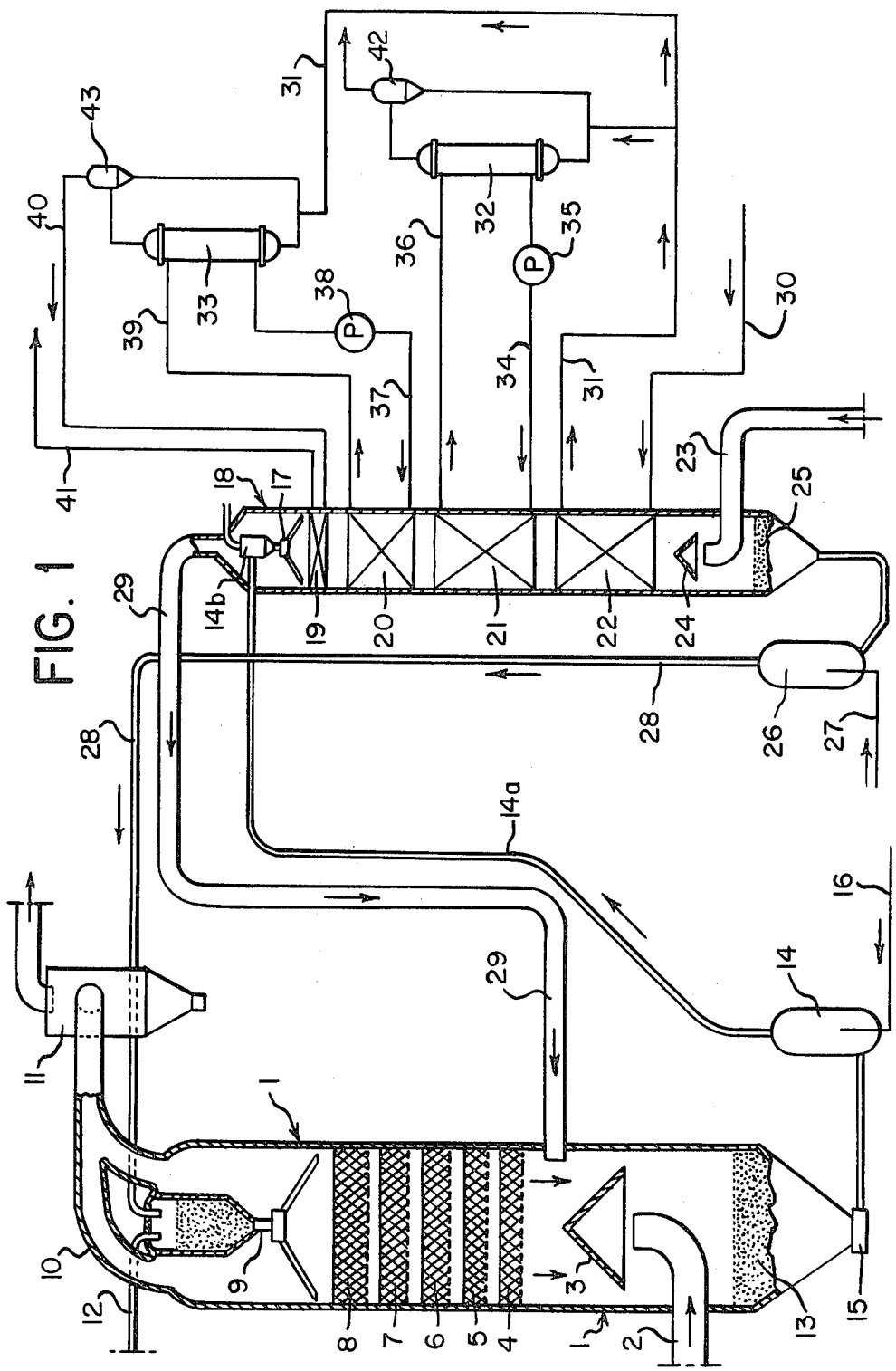
FIG. 1 represents an installation intended to use the process according to the invention.

The installation shown in FIG. 1 comprises a cylindrical column 1 having packings where the lower part of the column is connected to a conduit 2 which brings fumes to the center of column 1 and under a baffle 3.

The column which has a diameter of 2,800 mm, has above conduit 2, five successive stages 4, 5, 6, 7 and 8 respectively, each made up of a grate with larges meshes (60×20 mm) made up of refractory steel strips, set edgewise, 15×1 mm spot welded, having an opening or space rate of 93% and supporting a stack of Pall rings of refractory steel 25×25 mm having a 94% porosity.

The height of the packing of each stage in the direction of the flow of the gases is 150 mm, 150 mm, 200 mm, 200 mm and 300 mm respectively. The space between the upper part of a stack and the following stage is 150 mm.

A rotary distributor 9 of solid particles as described in French patent 78/18291 distributes the particles separated from one another, over the entire surface of the highest stage 8.

Column 1 comprises, above distributor 9, a stack 10 for evacuation of the fumes which exit into cyclone 11. This cyclone 11 separates fine particles and dust that escape from the packing of column 1.

A conduit 12 makes it possible to bring to distributor 9 replacement or additional solid particles (limestone, for example).

The solid particles flowing by gravity into column 1 are collected at the bottom of the column in a hopper 13.

A pneumatic conveyer 14 comprising an extractor 15 and an air booster 16 brings, by conduit $14^a$, hot solid particles stored in hopper 13 to cyclone $14^b$ placed above a rotary distributor 17 which is placed at the top of a column 18 of rectangular section 0.55×0.60 m.

This column 18 comprises four banks of exchange layers 19, 20, 21 and 22 extending respectively downward. A conduit 23 coming out in the lower part of column 18 under a baffle 24 introduces cold air under pressure with a slight feed (by a blower) into column 18.

The solid particles that flow by gravity in column 18 are collected in a hopper 25 and are taken by a pneumatic conveyer 26 provided with an air booster 27 to be sent by conduit 28 to rotary distributor 9 of packing column 1 or to an intermediate cold particle storage.

The hot air leaving column 18 is conveyed by conduit 29 into column 1 under stage 4.

The banks of exchange layers are made up as follows:

Bank 22 acting as an economizer is made up of 12 horizontal layers of finned pipes which will be described below. A feed conduit 30 brings demineralized water under a pressure of 35 bars and at a temperature of 105° C. to each of the pipes of the lower layer. This water, after going through the pipes in series in the successive layers, leaves the upper layer by conduit 31.

This conduit 31 serves for supplying water to boilers 32 (boiler at 11 bars) and 33 (boiler at 30 bars).

Bank 21 acting as a low-pressure exchanger comprises 12 horizontal layers of finned pipes. A conduit 34, provided with a pump 35, brings to each of the pipes of the lower layer a thermofluid made up of a eutectic mixture $KNO_3$-$NaNO_2$-$NaNO_3$ in a weight ratio of 53/40/7 (mp=140°). This thermofluid leaves the upper layer by a conduit 36 and is sent to boiler 32 in which it serves to vaporize the water brought by conduit 31.

Bank 20 acting as a high-pressure exchanger is of the same type as bank 21 but comprises only 8 layers. A conduit 37, equipped with a pump 38, brings a thermofluid which leaves the upper part by a conduit 39. This conduit brings the thermofluid to boiler 33 in which it serves to vaporize the water brought by conduit 31.

Bank 19 acting as a superheater comprises only 2 layers. A conduit 40 brings the steam leaving boiler 33 to the pipes of the lower layer and a conduit 41, connected to the lower layer, supplies superheated steam.

Boilers 32 and 33 are of the standard thermosiphon type and have a recirculation rate of 10. Each comprises a devesiculating system with a cyclone, 42 and 43 respectively.

FIG. 2 shows finned pipes used in the bank of pipes 19 to 22. Pipe 44, which is represented, corresponds to two successive layers. It is an ordinary steel pipe with a diameter of 21–26 mm, equipped with square fins 45, of steel, 60×60 mm and 0.6 mm thick.

The number of fins is 166 per meter, which represents an exchange surface of 1 $m^2$ per meter of pipe. The length provided with fins in a layer is 500 mm.

The pipe is made like a hairpin and comprises under the first series of fins a second series of similar wins.

As shown in FIG. 3, each layer is made up of finned pipes. The bent part of each pipe 44 is staggered 66 mm in pitch in relation to the other part.

The group of these pipes is equivalent to a packing having a space rate of 75%.

FIG. 4 shows a variant of the pipes used in banks of layers 19 to 22. Each layer comprises parallel pipes 46. These pipes are placed in the corrugations such as 47 and 48 of a corrugated iron sheet 49. In a layer, each pipe such as 46 is thus separated from the following one by the corrugated iron sheet. Corrugated iron 49 has perforations 50 in its upper part. These perforations can be, for example, perforations of 10×50 mm staggered at a pitch of 15 mm.

For example, the installation can be operated to recover heat from a glass furnace emitting 10,000 $Nm^3/h$ of fumes, at a temperature of 650° C. These fumes contain about 40 kg/h of $SO_3$ or mixture $SO_2+SO_3$.

The speed of the fumes in column 1 under stage 4 is 1.5 m/s.

Solid limestone particles having an average granulometry of 250 microns are used. It is also possible to use a mixture of sand and limestone. The limestone reacts with the $SO_2$ and $SO_3$ to form calcium sulfate and carbon dioxide.

The delivery of solid particles is 11 tons/hour and their input temperature in column 1 is 150° C.

These particles leave column 1 at a maximum temperature of 600° C., while the fumes leave column 1 at a temperature of 200° C.

The air delivery in column 18 is 1,000 $Nm^3/h$. 1.5 tons/h of superheated steam at 350° C. are obtained under a pressure of 30 bars in boiler 33 and 1.6 tons/h of saturated steam are obtained under a pressure of 11 bars in boiler 32.

The limestone is replaced at a rate of about 60 kg/h by sending it by conduit 12 into distributor 9.

Thus, a particularly effective heat recovery is obtained, while purifying the furnace fumes, particularly of $SO_3$ which it contains (up to 95% of the $SO_3$ is stopped) and without corrosion phenomenon occuring.

If it is desired to store energy for a day or more, it is possible to provide at the output of column 1 an insulated tank intended to store the hot particles before making the heat recovery in column 18.

FIG. 5 shows a variant $18^a$ of column 18. Column $18^a$, shown in FIG. 5, comprises a series of four fluidized beds of solid particles 51, 52, 53, 54 respectively placed in cascade.

Passage in cascade between the various beds is assured by siphons 55, 56 and 57 and evacuation of lower bed 54 is assured by siphon 58 coming out in tank 59. Each of these beds comprise a fluidization grill 60. A horizontal pipe such as coil 61 is placed in each of the beds. Fluidization air is introduced by conduit 62 under the grill of bed 54. Each of the pipes such as 61, is connected to a suitable device 63 for producing steam, for example, of the type shown in detail in FIG. 1.

Operation of this column $18^a$ is very close to that of column 18 of FIG. 1.

The solid particles distributed by distributor 64 fall by gravity on the upper fluidized bed and from there in cascade on the other fluidized beds. The gaseous current brought by pipe 62 assures fluidization of the various fluidized beds. The recovered heat can be used as in the case of column 18 to produce steam under 11 and 30 bars.

Figure 6:
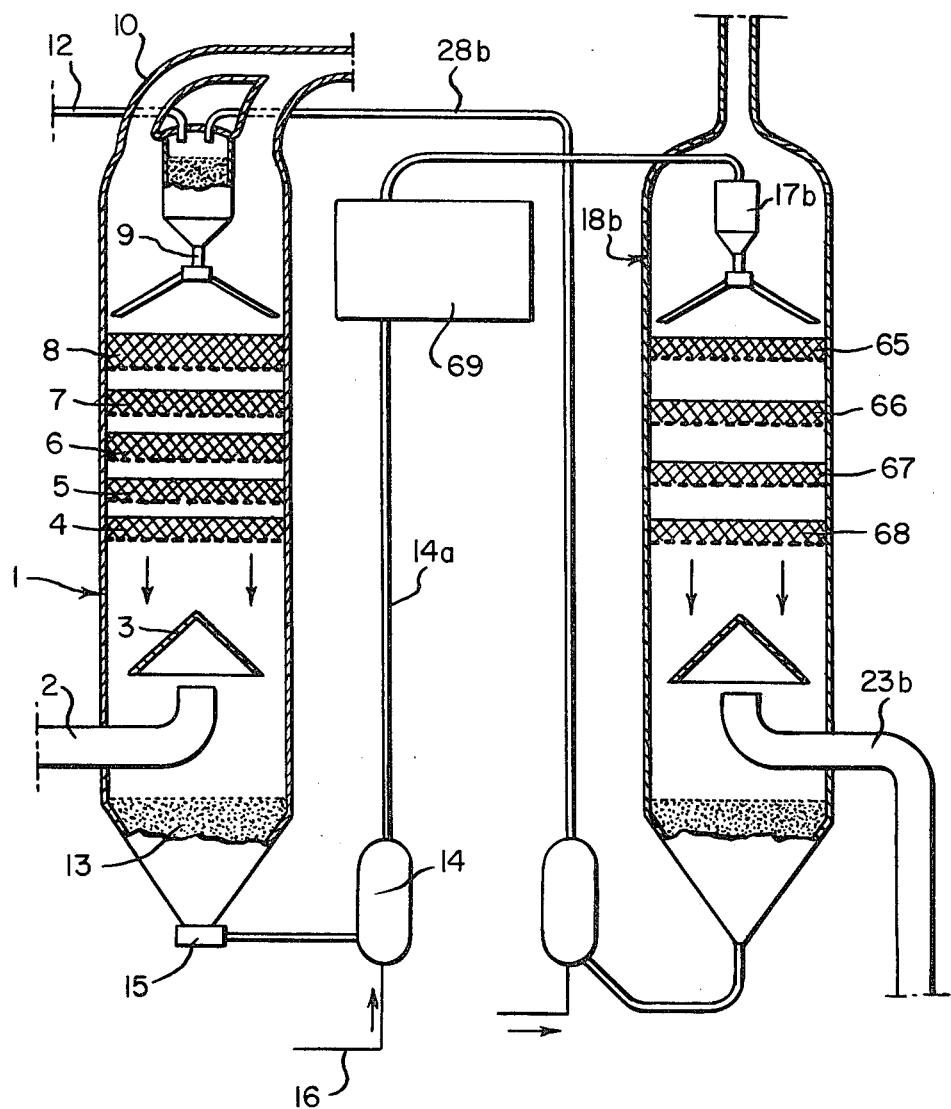
FIG. 6 represents a variant of an installation intended for direct heat recovery in the process according to the invention.

FIG. 6 shows an installation intended for direct heat recovery, i.e., without intermediate heat-carrying fluid, with only two currents in the second column, a descending current of solid particles and a rising gas current.

The installation shown in FIG. 6 comprises a first column 1 identical with that shown in FIG. 1. The heat particles obtained at the bottom of column 1 are brought by a pneumatic conveyer 14 to a rotary distributor $17^b$ at the top of column $18^b$. This column comprises four stages 65, 66, 67 and 68 respectively, similar to stages 4 to 8 of column 1.

A cold gas, such as air is introduced by a conduit $23^b$ at the lower part of column $18^b$. The solid particles flow by gravity in $18^b$ and are brought by conduit $28^b$ to the upper part of column 1.

Conduit $14^a$ which is used for bringing particles from column 1 to column $18^b$ includes a storage tank 60 making it possible to recover heat energy intermittently at a suitable time.

In such an installation operating with a mixture of sand and limestone and fumes at a temperature of 1000° C., it is possible to obtain at the output of column 1 solid particles at a temperature of 800° C. and purified fumes at a temperature of 200° C. In column $18^b$ where cold air is introduced, there are obtained at the outlet solid particles at 150° C. which are recycled in column 1 and air at a temperature of 700° C. This air, which is free of impurities such as $SO_3$, can be used in a standard pipe boiler. The slight drop between the temperature of the fumes and that of the recovered hot air will be noted.

We claim:

1. Process for recovering heat from a first hot gas current comprising the steps of introducing said first hot gas current into a first column having at least one stage made up of a stack of packing elements placed on a support grill, introducing cold separated solid particles into the top of said first column and allowing the particles to fall by gravity through said first column counter to said first gas current whereby the particles are heated, distributing the heated separated particles into the top of a second column and allowing the particles to fall by gravity through said second column, introducing a second gas current cooler than said heated particles into said second column counter to the direction of fall of said particles through said second column whereby said second gas current recovers heat from said particles, and introducing a heat carrying fluid which circulates in pipes in said second column and over which said second gas current flows whereby heat is transferred from said second gas current to said fluid.

2. Process according to claim 1 including the additional step of removing the second gas current at an outlet of said second column and mixing it with the first gas current introduced into said first column.

3. Process according to claim 1 wherein the pipes of the second column are arranged in the form of horizontal layers.

4. Process according to claim 3 wherein some of the particles are retained at the level of each layer of pipes.

5. Process according to claim 3 wherein pipes in the same layer extend parallel to each other and are equipped with fins such that each layer has a space rate on the order of 75%.

6. Process according to claim 4 wherein the pipes in the same layer extend parallel to each other and are placed in the corrugations of a perforated corrugated iron sheet having a space rate on the order of 75%.

7. Process according to claim 4 wherein each layer of pipes is buried in a fluidized bed of solid particles with the second gaseous current being injected at the base of said second column and wherein a siphon overflow is provided in the fluidized bed to feed lower fluidized beds thus insuring cascade dropping of the particles through said second column.

8. Process according to claim 1 including the additional steps of collecting said solid particles at the bottom of said second column and distributing them to the top of said first column.

9. Installation for using the process according to claim 1 wherein said first column has at least one stage made up of a stack of packing elements placed on a support grill, and having in addition a conduit for bringing the first gaseous current under said stage and means for distribution of the solid particles above said stage, and wherein said second column has therein pipes through which a heat-carrying fluid flows and having in addition a conduit for bringing the second gaseous current under the pipes, means for bringing the solid particles from the bottom of the first column to the top of the second column and means for distributing solid particles at the top of the second column.

10. Installation according to claim 9 wherein the pipes of the second column are arranged in the form of horizontal layers, the pipes of the same layer being parallel and connected to the pipes of an adjacent layer, which are staggered in relation to one another.

11. Installation according to claim 10 wherein in each layer, the pipes have heat exchange surfaces associated therewith being such that each layer exhibits a space rate on the order of 75%.

12. Installation according to claim 10 wherein each layer of pipes is placed over a fluidization grill, each grill being equipped with a siphon overflow system permitting the overflow from an upper fluidized bed created above a grill into a fluidized bed immediately below.

* * * * *